United States Patent
Zhao et al.

(10) Patent No.: US 12,345,824 B2
(45) Date of Patent: Jul. 1, 2025

(54) GNSS RECEIVER AND GNSS DEVICE

(71) Applicant: Shanghai Huace Navigation Technology Ltd, Shanghai (CN)

(72) Inventors: Kangde Zhao, Shanghai (CN); Bing Zhan, Shanghai (CN); Zhiqiang Hao, Shanghai (CN); Xiang Li, Shanghai (CN); Bo Zhao, Shanghai (CN); Bo Lv, Shanghai (CN); Wentao Zhong, Shanghai (CN); Jialin Zhang, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 0 days.

(21) Appl. No.: 16/976,758

(22) PCT Filed: Apr. 27, 2020

(86) PCT No.: PCT/CN2020/087171
§ 371 (c)(1),
(2) Date: Aug. 30, 2020

(87) PCT Pub. No.: WO2021/169024
PCT Pub. Date: Sep. 2, 2021

(65) Prior Publication Data
US 2024/0393474 A1    Nov. 28, 2024

(30) Foreign Application Priority Data

Feb. 26, 2020  (CN) .......................... 202010119272.9

(51) Int. Cl.
*G01S 19/34*    (2010.01)
*G01S 19/14*    (2010.01)

(52) U.S. Cl.
CPC .............. *G01S 19/34* (2013.01); *G01S 19/14* (2013.01)

(58) Field of Classification Search
CPC .................................. G01S 19/14; G01S 19/34
See application file for complete search history.

(56) References Cited

U.S. PATENT DOCUMENTS 5,504,684 A * 4/1996 Lau .......................... G01S 19/37
                                                           340/988
6,002,363 A * 12/1999 Krasner .................... H04B 1/28
                                                           342/357.62
(Continued)

FOREIGN PATENT DOCUMENTS

CN        104459715 A  *  3/2015
CN        105376854 A     3/2016
(Continued)

OTHER PUBLICATIONS

Collins Dictionaries (Ed.). (2014). Generatrix. In Collins English Dictionary (12th ed.). Collins. https://search.credoreference.com/articles/Qm9va0FydGljbGU6MzU4NTIzNQ == (Year: 2014).*

(Continued)

*Primary Examiner* — Vladimir Magloire
*Assistant Examiner* — Fred H Mull
(74) *Attorney, Agent, or Firm* — Mark H. Whittenberger; Holland & Knight LLP

(57) ABSTRACT

Disclosed is a GNSS receiver, including a state monitoring sensor and a processor. The state monitoring sensor is configured to monitor a state of the GNSS receiver, and generate a first triggering signal according to the state of the GNSS receiver. The processor is configured to switch from a resting operating state to a wake-up operating state according to the first triggering signal, and transmit position information about the GNSS receiver to a remote server at a preset rate. Further disclosed is a GNSS device.

16 Claims, 6 Drawing Sheets

(56) References Cited

U.S. PATENT DOCUMENTS

| | | | | |
|---|---|---|---|---|
| 2002/0070040 | A1* | 6/2002 | Oyang | H05K 5/063 29/603.27 |
| 2009/0303116 | A1* | 12/2009 | Wirola | G01S 19/29 342/357.26 |
| 2010/0117825 | A1* | 5/2010 | Boccacci | H01Q 1/526 340/539.13 |
| 2010/0117900 | A1 | 5/2010 | van Diggelen et al. | |
| 2011/0071759 | A1 | 3/2011 | Pande et al. | |
| 2011/0285587 | A1* | 11/2011 | Vollath | G01S 19/071 342/357.62 |
| 2012/0223860 | A1 | 9/2012 | Leclercq | |
| 2013/0009811 | A1 | 1/2013 | van Diggelen et al. | |
| 2015/0346347 | A1 | 12/2015 | Tsai et al. | |
| 2018/0041965 | A1 | 2/2018 | Korneluk et al. | |

FOREIGN PATENT DOCUMENTS

| | | | | |
|---|---|---|---|---|
| CN | 106595698 | A | | 4/2017 |
| CN | 108845337 | A * | | 11/2018 |
| CN | 109061681 | A | | 12/2018 |
| CN | 208270766 | U | | 12/2018 |
| CN | 110133686 | A * | | 8/2019 |
| CN | 110261878 | A * | | 9/2019 ............... G01C 5/00 |
| EP | 1726915 | A1 * | | 11/2006 ............ G01C 15/06 |
| WO | 2021/169024 | A1 | | 9/2021 |

OTHER PUBLICATIONS

M. Barile et al., "Arc." From MathWorld—A Wolfram Web Resource. https://mathworld.wolfram.com/Arc.html (Year: 2024).*
M. Insall et al., "Curve." From MathWorld—A Wolfram Web Resource. https://mathworld.wolfram.com/Curve.html (Year: 2024).*
E. W. Weisstein, "Surface." From MathWorld—A Wolfram Web Resource. https://mathworld.wolfram.com/Surface.html (Year: 2024).*
International Search Report, International Patent Application No. PCT/CN2020/087171, Dec. 1, 2020.
Office Action issued in CN202010119272.9 issued Jul. 5, 2022 with translation., 14 pages.
Extended European Search Report, EP20757821.2, Jan. 10, 2022.

* cited by examiner

US 12,345,824 B2

GNSS RECEIVER AND GNSS DEVICE

This application claims priority International Patent Application No. PCT/CN2020/087171 filed on Apr. 27, 2020, which in turn claims priority to Chinese patent application No. 202010119272.9 filed on Feb. 26, 2020, the disclosures of which are incorporated herein by reference in their entirety.

TECHNICAL FIELD

The present application relates to the technical field of a global satellite system, for example, a GNSS receiver and a GNSS device.

BACKGROUND

At present, a global navigation satellite system (GNSS) receiver has been widely used in the fields of geographical mapping and geological disaster monitoring. In some sections with frequent geological disasters, such as a mountain slope, GNSS detection systems can be disposed at intervals to monitor whether a landform of the mountain slope has changed, thereby giving early warning to the upcoming a mountain landslide and other disasters. After a GNSS device is put into use, the GNSS receiver is usually in a normally open operating state to avoid data missing. However, the existing problem is that it may take a long time for the landform of the mountain slope to change slightly; in this way, before the landform of the mountain slope changes, the GNSS receiver is in an operating state for a long time, and a battery storing sufficient electric energy is required to supply power to the GNSS receiver, so that the consumption energy of the overall device is high, the battery volume is large, and the off-field installation is difficult.

SUMMARY

A GNSS receiver and a GNSS device are provided in the present application to achieve low power consumption, simple installation and short construction time of the overall device.

Provided is a GNSS receiver, including a state monitoring sensor and a processor. The state monitoring sensor is configured to monitor a state of the GNSS receiver, and generate a first triggering signal according to the state of the GNSS receiver. The processor is configured to switch from a resting operating state to a wake-up operating state according to the first triggering signal, and transmit position information about the GNSS receiver to a remote server at a preset rate.

Provided is a GNSS device, including the GNSS receiver, and the GNSS device further includes a securing column, a lithium battery and a solar panel. The solar panel is located on a side face of the securing column, the lithium battery is hung inside the securing column, and the GNSS receiver is fixed on a top of the securing column. The solar panel is configured to charge the lithium battery, the lithium battery is connected to the GNSS receiver through a data line and configured to supply power to the GNSS receiver and transmit data of the lithium battery to the GNSS receiver, and the GNSS receive is configured to transmit the data of the lithium battery to the remote server at a preset rate.

DETAILED DESCRIPTION

Figure 1:
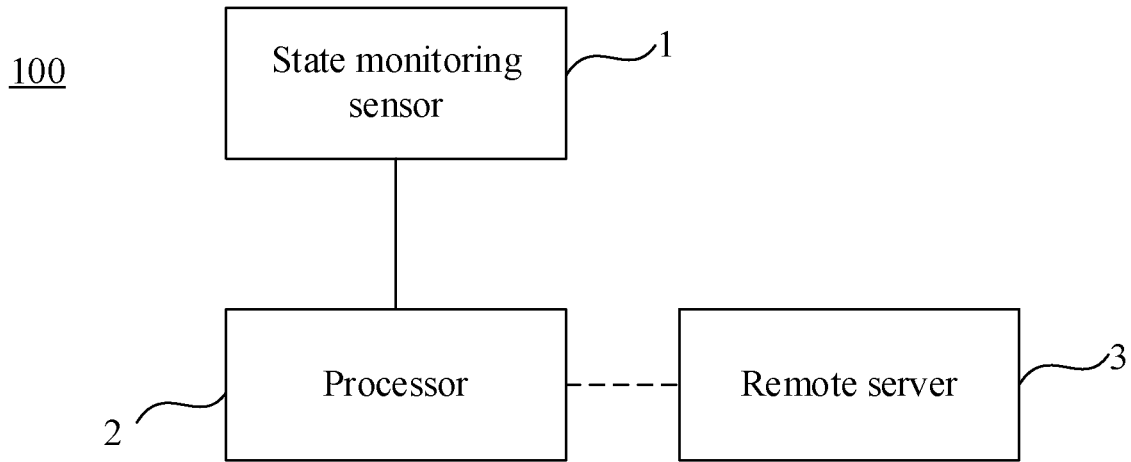
FIG. 1 is a block schematic diagram of a GNSS receiver according to an embodiment of the present application.

The present application will be further described in detail with reference to the accompanying drawings and embodiments. FIG. 1 is a block schematic diagram of a GNSS receiver according to an embodiment of the present application. As shown in FIG. 1, a global navigation satellite system (GNSS) receiver 100 includes a state monitoring sensor 1 and a processor 2. The state monitoring sensor 1 is configured to monitor a state of the GNSS receiver 100, and generate a first triggering signal according to the state of the GNSS receiver 100. The processor 2 is configured to switch from a resting operating state to a wake-up operating state according to the first triggering signal, and transmit position information about the GNSS receiver 100 to a remote server 3 at a preset rate.

A position state of the GNSS receiver 100 may timely reflect a change of landform or terrain in which the GNSS receiver 100 is installed. In a case where the landform or terrain changes, the position state of the GNSS receiver 100 will change accordingly. For example, the GNSS receiver 100 is installed in a certain mountain, and in a case where a mountain landslide occurs, the position state of the GNSS receiver 100 is shifted from an initial state, that is, a current position of the GNSS receiver 100 is changed from an initial position. Therefore, in a case where a state of the GNSS receiver 100 changes, the change of the landform or terrain may be reflected, where whether or not the position state of the GNSS receiver 100 is changed is defined as the state of the GNSS receiver 100.

The state monitoring sensor 1 is configured to monitor whether or not the position state of the GNSS receiver 100 is changed. In a case where the state monitoring sensor 1 monitors that the position state of the GNSS receiver 100 is changed, the state monitoring sensor 1 judges that the landform or terrain is changed, and generates the first triggering signal. At the moment, the processor 2 switches from the resting operating state to the wake-up operating state according to the first triggering signal, and transmits the position information about the GNSS receiver 100 to the remote server 3 at the preset rate to remind a technician of the change of the landform or terrain of the current position where the GNSS receiver 100 is located. In this embodiment, in a case where the landform or terrain is not changed, a situation that the processor 2 is still in the wake-up operating state and transmits the position information about the GNSS receiver 100 to the remote server 3 to waste electric energy may be avoided.

In one embodiment, the state monitoring sensor 1 is an acceleration sensor, where the acceleration sensor is configured to monitor an acceleration of the GNSS receiver 100, and generate the first triggering signal when the acceleration of the GNSS receiver 100 is greater than a first preset value.

In a case where the acceleration of the GNSS receiver 100 is greater than the first preset value, the position state of the GNSS receiver 100 is considered to be changed, where the first preset value may be in a range from 50 mg to 200 mg. That is, in a case where the acceleration sensor monitors that the acceleration of the GNSS receiver 100 is greater than the first preset value, the acceleration sensor generates the first triggering signal to trigger the processor 2 to switch from the resting operating state to the wake-up operating state. The state monitoring sensor 1 may be the acceleration sensor, and the acceleration sensor may be selected as an ADXL362 model acceleration sensor.

In one embodiment, the processor 2 is further configured to switch from the wake-up operating state to the resting operating state in response to transmitting the position information about the GNSS receiver 100 continuously for N times to the remote server 3, where N is a positive integer.

After the processor 2 is in the wake-up operating state, the processor 2 transmits the position information about the GNSS receiver 100 to the remote server at the preset rate, where the preset rate may be determined according to the actual situation. In one embodiment, the preset rate is 1 Hz, and in a case where the position information about the GNSS receiver 100 transmitted by the processor 2 to the remote server continuously for 5 to 10 minutes is the same or nearly the same (the difference between the two is less than a certain threshold value, that is, the difference is almost negligible), the position state of the GNSS receiver 100 may be judged to remain almost unchanged, and the processor 2 further switches from the wake-up operating state to the resting operating state, where N may be selected as 400.

After the GNSS receiver 100 is installed and debugged, the processor 2 is in the resting state by default. In a case where the state monitoring sensor 1 monitors a change in the state of the GNSS receiver 100, the state monitoring sensor 1 generates the first triggering signal and the first triggering signal triggers the processor 2 to switch from the resting operating state to the wake-up operating state; the processor 2 transmits the position information about the GNSS receiver 100 to the remote server 3 at the preset rate, and in a case where the position information about the GNSS receiver 100 transmitted continuously for N times is the same or nearly the same, the processor 2 is triggered to switch from the wake-up operating state to the resting operating state.

In a case where the processor 2 is in the resting operating state, the processor 2 only receives the first triggering signal from the state monitoring sensor 1. That is, in a case where the processor 2 is in the resting operating state, the state monitoring sensor 1 is always in an operating state, and has a static and dynamic trigger function. After the state monitoring sensor 1 detects that the first preset value is exceeded, the state monitoring sensor 1 transmits the first triggering signal, i.e., an interrupt signal, to the processor 2 in the GNSS receiver 100, so as to wake up the processor 2 and upload latest position information data of the GNSS receiver 100 to the remote server 3.

Figure 2:
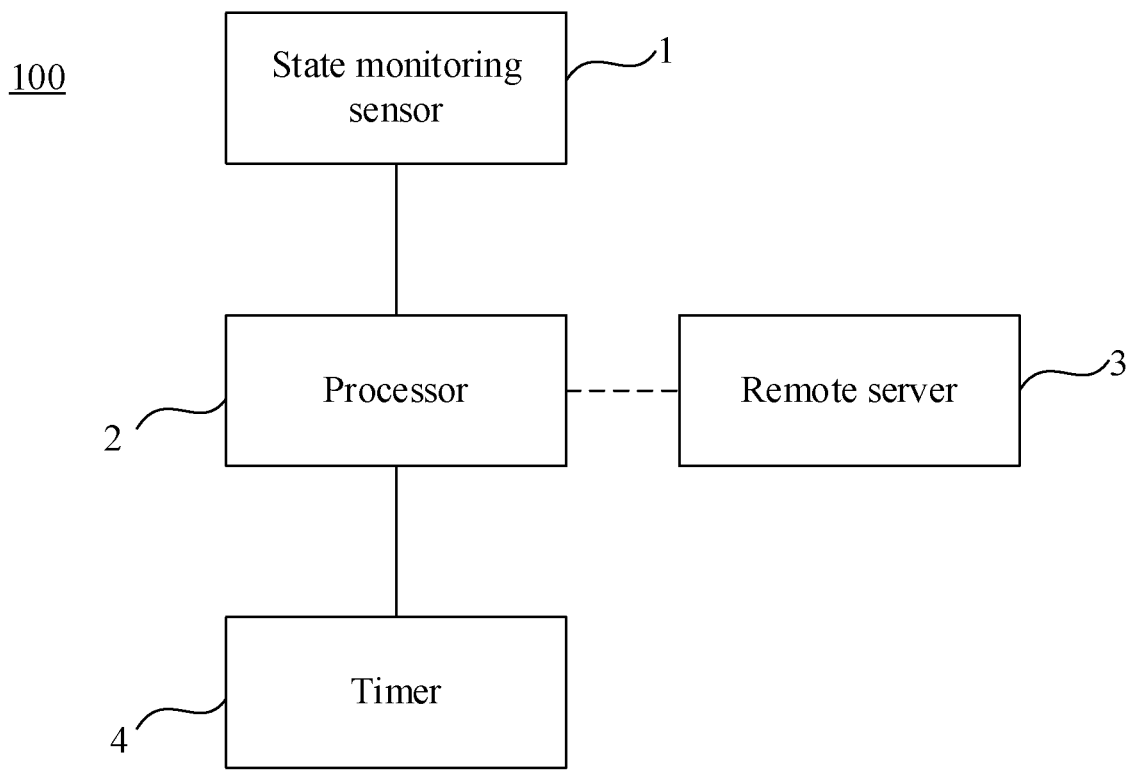
FIG. 2 is a block schematic diagram of a GNSS receiver according to another embodiment of the present application.

In one embodiment, as shown in FIG. 2, the GNSS receiver 100 further includes a timer 4, where the timer 4 is configured to start timing in response to the processor 2 switching from the wake-up operating state to the resting operating state, and generate a second triggering signal in a case where a duration recorded by the timer 4 is greater than a second preset value. The processor 2 switches from the resting operating state to the wake-up operating state according to the second triggering signal or the first triggering signal, and then, it is prevented that in a case where the processor 2 does not receive the first triggering signal for a long time, the remote server 3 does not receive the position information about the GNSS receiver 100 for a long time. The timer 4 is used together with the state monitoring sensor 1, which is beneficial to monitoring a position state of the GNSS receiver 100 in time on the basis of ensuring the low power consumption of the processor 2.

In a case where a duration of the processor 2 in the resting operating state recorded by the timer 4 is greater than the second preset value, the timer 4 generates the second triggering signal so as to trigger the processor 2 to switch from the resting operating state to the wake-up operating state. The state monitoring sensor 1 also monitors the state of the GNSS receiver 100 while the timer 4 records the duration of the processor 2 in the resting operating state. In a case where the duration of the processor 2 in the resting operating state recorded by the timer 4 is greater than the second preset value or the state of the GNSS receiver 100 monitored by the state monitoring sensor 1 changes and only one of the two conditions is satisfied, the processor 2 switches from the resting operating state to the wake-up operating state, so that the position information about the GNSS receiver 100 is prevented from be omitted in a case where the terrain or landform is not changed for a long time.

The processor 2 may be a SAMA5 model processor that integrates a DDR (Double Data Rate SDRAM) function, power consumption of a single chip is less than 0.25 W, and the SAMA5 model processor may be waked up through the timer 4 or the state monitoring sensor 1.

The second preset value may be set according to the change of the terrain or landform. If a change of the terrain or landforms is relatively fast, the second preset value may be set to be smaller; and if the change of terrain or landform is relatively slow, the second preset value may be set to be larger. For example, in a case where the GNSS receiver 100 is just installed, the terrain or landform will not be changed quickly, and the processor 2 may not receive the first triggering signal, and at this time, the second preset value may be set to 6 hours. In a case where the processor 2 receives the first triggering signal for one time, the second preset value may be set to 3 hours. In a case where the processor 2 receives a triggering signal for two or more times, the second preset value may be set to half an hour or several minutes. With frequency of receiving the first triggering signal by the processor 2 becomes higher and higher, it indicates that the terrain or landform changes faster and faster. Therefore, setting the second preset value shorter is advantageous to timely monitor the current position information about the GNSS receiver 100.

Through the mutual cooperation of the timer 4 and the state monitoring sensor 1, the processor 2 of the GNSS receiver 100 can be in the resting state for a certain period of time on the basis of satisfying the transmission of the position information about the GNSS receiver 100, which is beneficial to reducing power consumption and saving electric energy.

Figure 3:
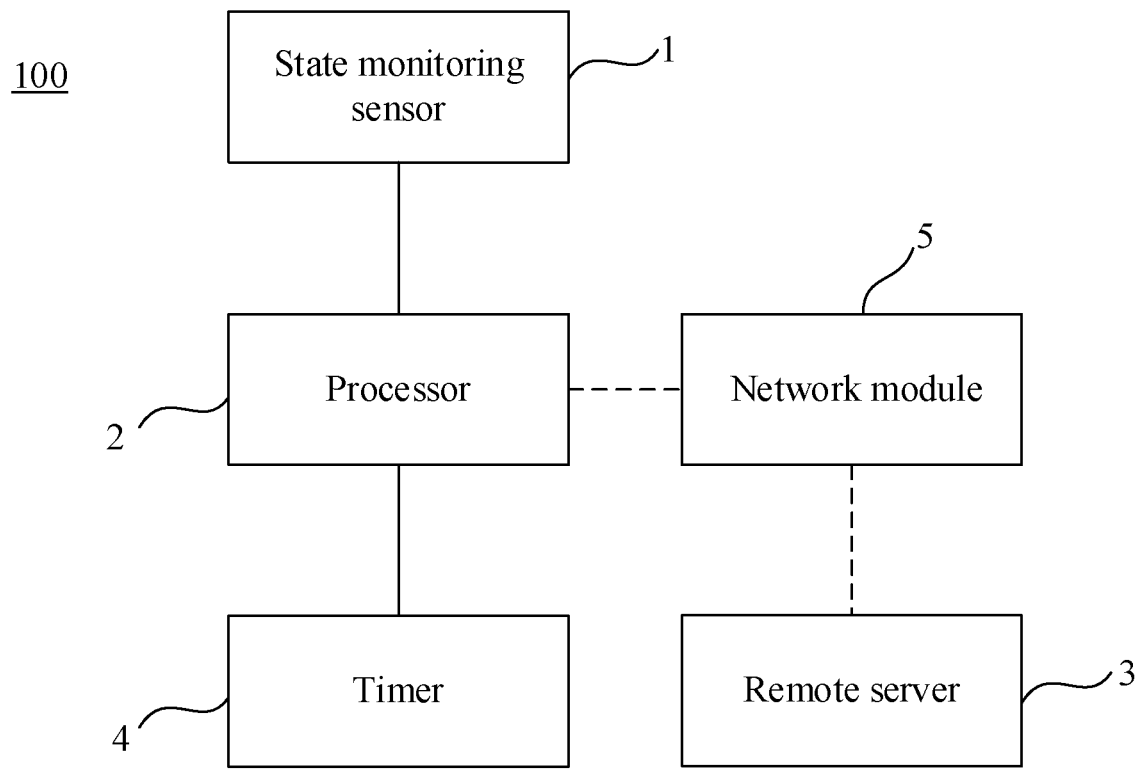
FIG. 3 is a block schematic diagram of a GNSS receiver according to another embodiment of the present application.

In one embodiment, as shown in FIG. 3, the GNSS receiver 100 further includes a network module 5. In a case where the processor 2 is in the wake-up operating state, the network module 5 is configured to establish communication between the processor 2 and the remote server 3.

The network module 5 may be a WIFI module or a 4G/5G full-Netcom or the like. In a case where the processor 2 is in the wake-up operating state, the network module 5 starts to operate to establish a communication connection between the processor 2 and the remote server 3, thereby enabling the processor 2 to send the position information about the GNSS receiver to the remote server 3. It is to be noted that the network module 5 may also be a network module 5 known to those skilled in the art and is not specifically limited herein.

Figure 4:
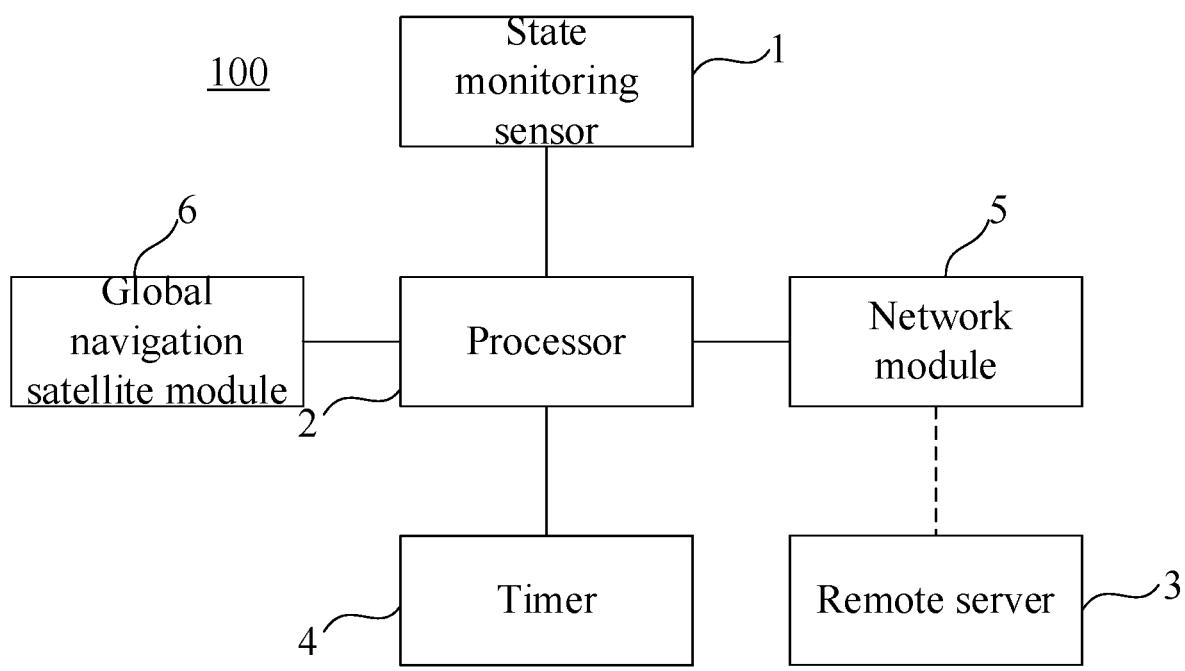
FIG. 4 is a block schematic diagram of a GNSS receiver according to another embodiment of the present application.

In one embodiment, as shown in FIG. 4, the GNSS receiver 100 further includes a global navigation satellite module 6. In a case where the processor 2 is in the wake-up operating state, the global navigation satellite module 6 is configured to acquire the position information about the GNSS receiver 100 at the preset rate, and transmit the position information about the GNSS receiver 100 to the processor 2.

The global navigation satellite module 6 may be a high-precision positioning module under SOC technology. One chip integrates a satellite signal receiving function and a demodulation function, outputs original observed quantity through a serial port, i.e. performs serial port communication with the processor 2, supports Beidou, GPS and GOLNASS satellite systems, and has a static horizontal accuracy better than 2.5 mm and a height accuracy better than 5 mm. Power consumption of the one chip is only 0.3 w, cost of the one chip is much lower than that of a high-precision board card, and the one chip may satisfy operational requirements. In a case where the processor 2 is in the wake-up operating state, the global navigation satellite module 6 receives a satellite signal, i.e., the position information about the GNSS receiver 100, sent by a global navigation satellite system, and transmits the satellite signal to the processor 2, and the processor 2 transmits the position information about the GNSS receiver 100 to the remote server 3 through the network module 5 for a technician to observe the change of the terrain or landform in which the GNSS receiver 100 is installed.

In a case where the processor 2 is in the resting operating state, the global navigation satellite module 6 is also in a resting state and does not receive the satellite signal sent by the global navigation satellite system, which is beneficial to reducing consumption of the electric energy.

A low power consumption processor 2 and the global satellite navigation module 6 are adopted, functions are reduced, and operating modes of resting and wake-up are adopted, where the wake-up adopts two modes of timing wake-up and triggering wake-up. The power consumption and cost of the GNSS receiver 100 are reduced on the premise of ensuring practical function and performance.

Figure 5:
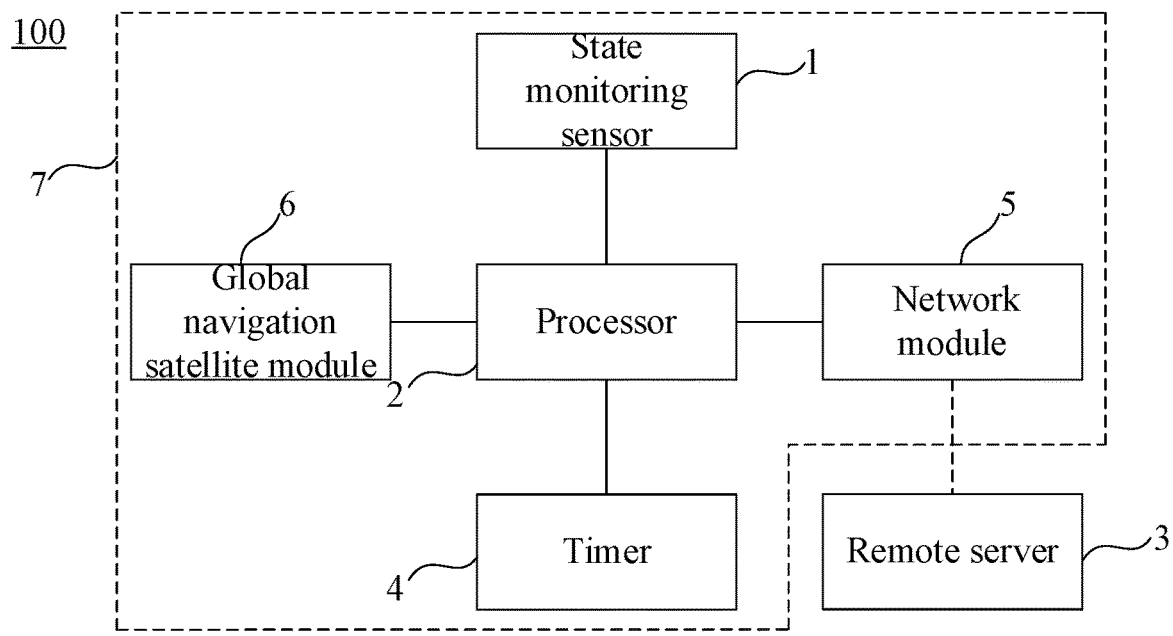
FIG. 5 is a block schematic diagram of a GNSS receiver according to another embodiment of the present application.

In one embodiment, as shown in FIG. 5, the global navigation satellite module 6, the network module 5, the timer 4, the state monitoring sensor 1 and the processor 2 are integrated on a main circuit board 7, so that the main circuit board 7 is integrated and occupied space of the main circuit board 7 in the GNSS receiver 100 is saved.

The main circuit board 7 may be a printed circuit board assembly (PCBA) main circuit board. The PCBA main circuit board is also integrated with a power supply processing module (not shown in the drawings), where the power supply processing module is used for converting a voltage or current of an external power supply into a voltage or current available for the processor 2.

Figure 6:
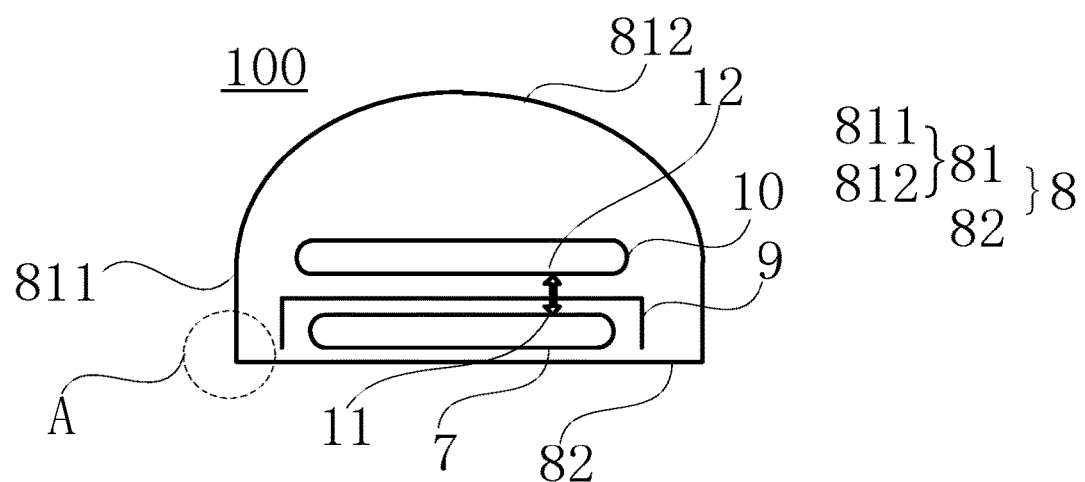
FIG. 6 is a structural schematic diagram of a GNSS receiver according to an embodiment of the present application.

In one embodiment, as shown in FIG. 6, the GNSS receiver 100 further includes a housing 8, a shielding box 9 and an antenna 10. The shielding box 9 is located inside the housing 8, the main circuit board 7 is located inside the shielding box 9, and the antenna 10 is located outside the shielding box 9. The main circuit board 7 is provided with a first radio frequency interface 11, the antenna 10 is provided with a second radio frequency interface 12, the shielding box 9 is provided with a through hole, and the first radio frequency interface 11 and the second radio frequency interface 12 are in a plug-in connection through the through hole. Through the plug-in connection, the use of radio frequency wires is omitted, materials are saved, and installation is fast and convenient.

The antenna 10 and the main circuit board 7 are in the plug-in connection through the first radio frequency interface 11 and the second radio frequency interface 12, the antenna 10 and the main circuit board 7 are isolated by a shielding box 9, and the antenna 10, the main circuit board 7 and the shielding box 9 are integrated inside a structural housing 8, so that the GNSS receiver 100 achieves an integrated design.

In one embodiment, an antenna of the global navigation satellite module 6 and a network antenna of the network module 5 are integrated into the antenna 10, so that the weight of the GNSS receiver 100 is lightened, and a conventional external chuck antenna is eliminated, thereby enhancing the capability of receiving and transmitting mobile signals.

The antenna 10 may adopt an air dielectric antenna, which is light in weight. The antenna 10 is compatible with two 2.4 GHz mobile network antennas, and may achieve that one antenna is compatible with two functions on the basis of the same volume of the antenna 10. The antenna of the global satellite navigation module 6 and the network antenna of the network module 5 are integrated in one, the volume of the one is only the size of a conventional receiver. Inside the GNSS receiver 100, the antenna 10 and the main circuit board 7 are connected in a plug-in manner through the first radio frequency interface 11 and the second radio frequency interface 12, thereby the GNSS receiver 100 is integrated, simple in structure, low in cost and reduced in installation complexity to the greatest extent.

A full-frequency antenna of the global navigation satellite module 6 and a 4G full-Netcom network antenna of the network module 5 are integrated in the antenna 10 to form an integrated multi-mode-and-multi-frequency combined antenna, and the integrated multi-mode-and-multi-frequency combined antenna receives or sends signals at the same time. The frequency bands of receiving or sending the signals by the two antennas are different, thus avoiding mutual interference between the two antennas.

Figure 7:
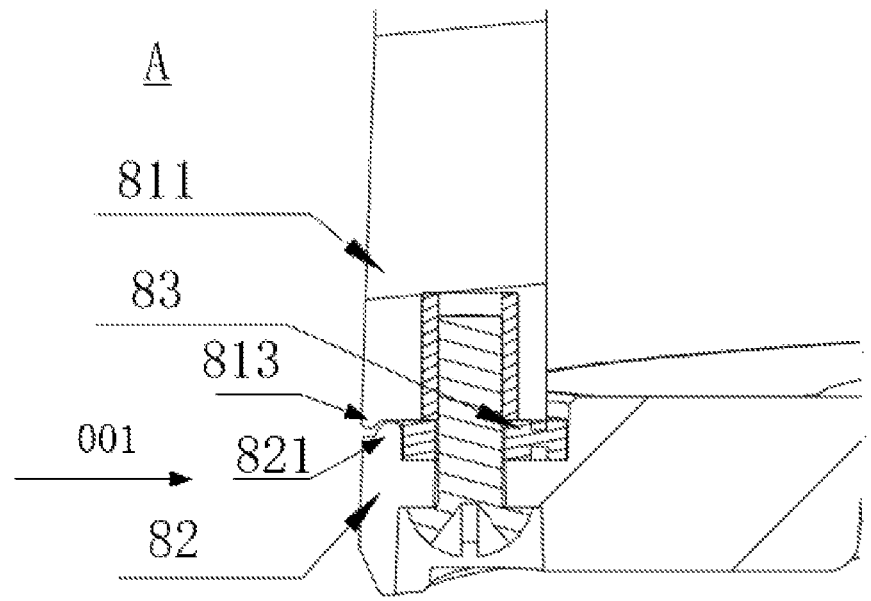
FIG. 7 is a partial enlarged view of a part A of FIG. 6.
Figure 8:
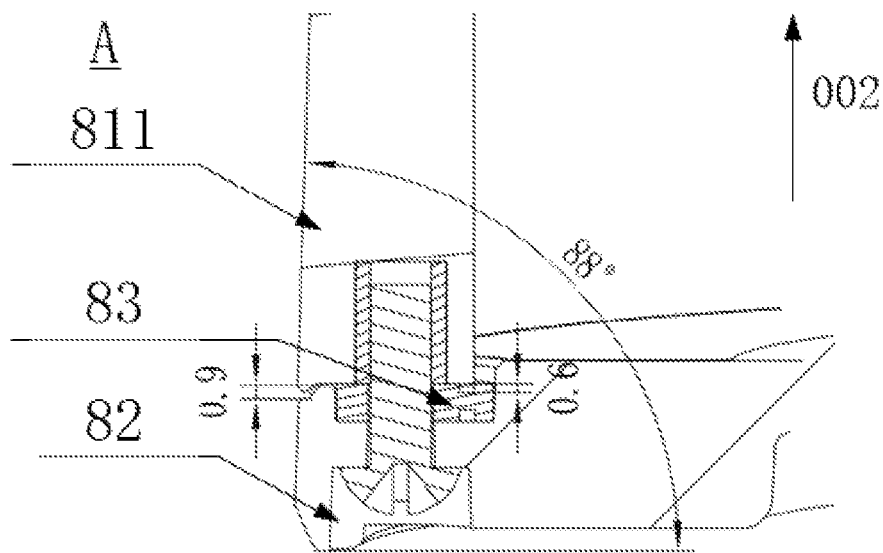
FIG. 8 is another partial enlarged view of the part A of FIG. 6.

In one embodiment, as shown in FIGS. 6, 7 and 8, the housing 8 includes a first shell 81, a second shell 82 and a gasket 83, where an end face of the first shell 81, the gasket 83 and an end face of the second shell 82 are fixedly connected by a bolt, and the gasket 83 is in interference fit between the end face of the first shell 81 and the end face of the second shell 82.

After the housing 8 is sealed by the gasket 83, an interference size may be 0.6 mm, so that the housing 8 is well sealed and the GNSS receiver 100 may be ensured to be used outdoors for a long time. The gasket 83 may be a silicone loop.

In one embodiment, as shown in FIG. 6, the first shell 81 includes a circular table side face 811 and an arc-shaped cover 812 formed by extending outwards from the circular table side face.

An end face of the circular table side face 811 of the first shell 81 is connected to the end face of the second shell 82 by a bolt. The two may also be connected by other means of connection well known to those skilled in the art, which is not limited herein.

In one embodiment, as shown in FIG. 8, an included between a generatrix of the circular table side face 811 and a central axis of the circular table side face 811 lies in a range of 1° to 5°, for example, the included angle may be 2°. Setting of the structure is beneficial to the falling of rainwater or the like, to prevent the corrosion of the housing of the GNSS receiver 100.

In one embodiment, as shown in FIG. 7, the end face of the second shell 82 is provided with a first step 821, and the first step 821 is arranged from low to high in a direction pointing from an outside of the second shell 82 to an inside of the second shell 82, so as to prevent the rainwater from entering the housing and causing damage to internal parts when the rainwater falls.

The direction pointing from the outside of the second shell 82 to the inside of the second shell 82 is a first direction 001 shown in FIG. 7, that is, a direction indicated by an arrow. The first step 821 is arranged from low to high, that is, along the first direction 001, first low and then high.

In one embodiment, as shown in FIG. 7, the end face of the first shell 81 is provided with a second step 813, and the second step 813 is arranged from high to low in a direction pointing from an outside of the first shell 81 to an inside of the first shell 81.

The first direction 001 in FIG. 7 is the direction pointing from the outside of the first shell 81 to the inside of the first shell 81, and the second step 813 is arranged from high to low. It is to be noted that the first step 821 and the second step 813 are staggered and fitted to each other so as to prevent the rainwater from flowing down along the circular table side face 811 to flow into the interior of the housing and corrode the parts inside the housing 8.

In one embodiment, the first step 821 is vertically pointed to the first shell 81 along the second shell 82, and has a height in a range of 0.5 mm to 2 mm. The manufacture procedure is simple.

A direction in which the second shell 82 is vertically pointed to the first shell 81 is a second direction 002 shown in FIG. 8, and a height of the first step 821 may be selected as 0.9 mm.

Thus, the arrangement of the first shell 81 and the second shell 82 is beneficial to preventing the GNSS receiver 100 from water intake. Moreover, the integrated arrangement of the shielding box 9, the antenna 10 and the main circuit board 7 is beneficial to the integration of the GNSS receiver 100 and reducing the complexity of later installation. In addition, by switching the resting operating state and the wake-up operating state of the processor 2, the idle time power consumption of the GNSS receiver is reduced, the electric energy is saved, and the endurance time of the system is further improved. That is, the system is highly integrated, the number of components is reduced, and the consumption on transportation and installation is saved. In a traditional solution, two core functions, namely, the antenna and the GNSS receiver, are integrated into one structure to achieve the volume of a conventional antenna with the functions of the antenna and the GNSS receiver, and an original radome is removed.

In conclusion, the GNSS receiver 100 is provided in embodiments of the present application. The state monitoring sensor 1 is configured to monitor the state of the GNSS receiver 100, and generate the first triggering signal according to the state of the GNSS receiver 100; and the processor 2 is configured to switch from the resting operating state to the wake-up operating state according to the first triggering signal, and transmit the position information about the GNSS receiver 100 to the remote server 3 at the preset rate. Therefore, the processor 2 switches the operating state according to a state change of the GNSS receiver 100. In a case where the state of the GNSS receiver 100 is changed, the processor 2 is in the resting operating state, thereby saving power consumption and reducing the use of electric quantity.

Figure 9:
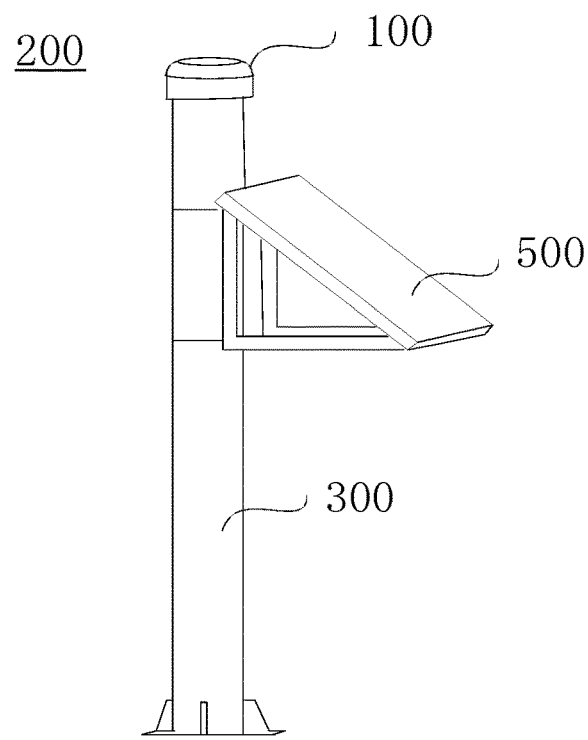
FIG. 9 is a structural schematic diagram of a GNSS device according to an embodiment of the present application.
Figure 10:
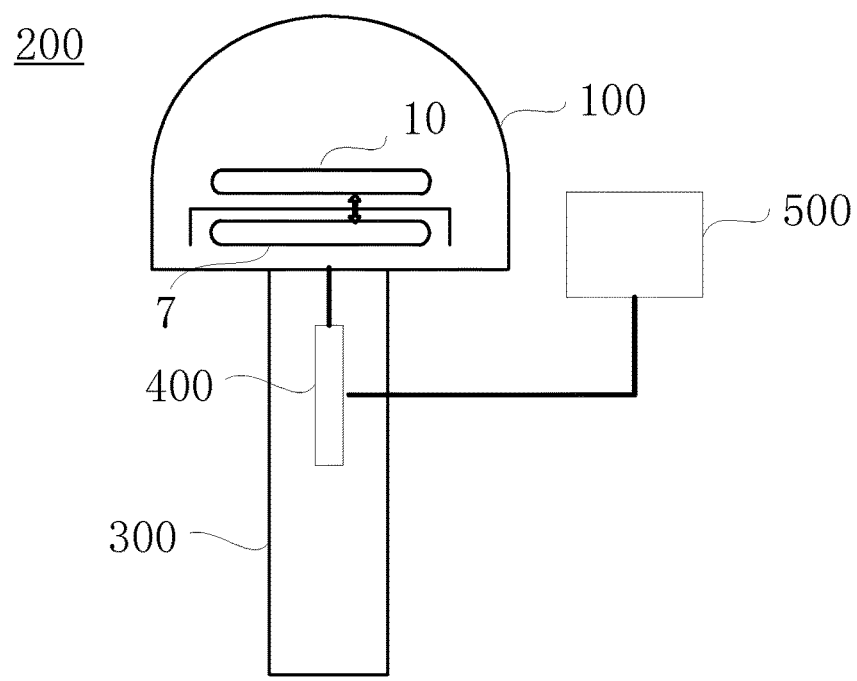
FIG. 10 is a structural schematic diagram of a GNSS device according to another embodiment of the present application.

FIG. 9 is a structural schematic diagram of a GNSS device according to an embodiment of the present application. As shown in FIGS. 9 and 10, a GNSS device 200 includes the GNSS receiver 100, a securing column 300, a lithium battery 400 and a solar panel 500. The solar panel 500 is located on a side face of the securing column 300, the lithium battery 400 is hung inside the securing column 300, and the GNSS receiver 100 is fixed on a top of the securing column 300.

The solar panel 500 is configured to charge the lithium battery 400, and the lithium battery 400 is connected to the GNSS receiver 100 through a data line and configured to supply power to the GNSS receiver 100 and transmit data of the lithium battery 400 to the GNSS receiver 100.

Due to the processor 2 switching between the resting operating state and the wake-up operating state in the GNSS receiver 100, the power consumption of the GNSS receiver is low. Therefore, the lithium battery is used for replacing a lead-acid battery, not only the power supply requirements can be satisfied, but also the lithium battery does not need to be buried with soil in an installation aspect, the construction is simple, the operation is convenient, and the construction process is greatly improved.

The GNSS receiver 100 and the securing column 300 are fixedly connected by a flange. The securing column 300 may be a steel tube with a flange welded at the top of the securing column 300, and a flanged base is provided at a bottom of the GNSS receiver 100, and the flanged base is fixedly connected to the flange at the top of the securing column 300 by a bolt. The lithium battery 400 is connected to the GNSS receiver 100 through a data line. The solar panel 500 is electrically connected to the lithium battery 400. The solar panel 500 converts solar energy into electric energy and charges the lithium battery 400; and the lithium battery 400 supplies power to the GNSS receiver 100 through the data line and transmits battery data information about the lithium battery 400 to the GNSS receiver 100.

The lithium battery 400 is hung inside the securing column 300, the installation is simple, and the lithium battery 400 has two interfaces, namely a charging interface and a power supply interface. The charging interface is connected to the solar panel 500 through an aerial plug, and the power supply interface includes battery power supply and RS232 serial port signal lines, where the GNSS receiver 100 is provided with a seven-core LEMO head connected to the RS232 serial port signal line led out from the lithium battery 400. The GNSS receiver 100 is further provided with a SIM card to provide a network address and a serial number of the GNSS receiver 100. An access door is also provided on the securing column 300 corresponding to a position where the lithium battery 400 is hung. In a case where the lithium battery 400 fails, the technician can replace the lithium battery 400 through the access door.

Figure 11:
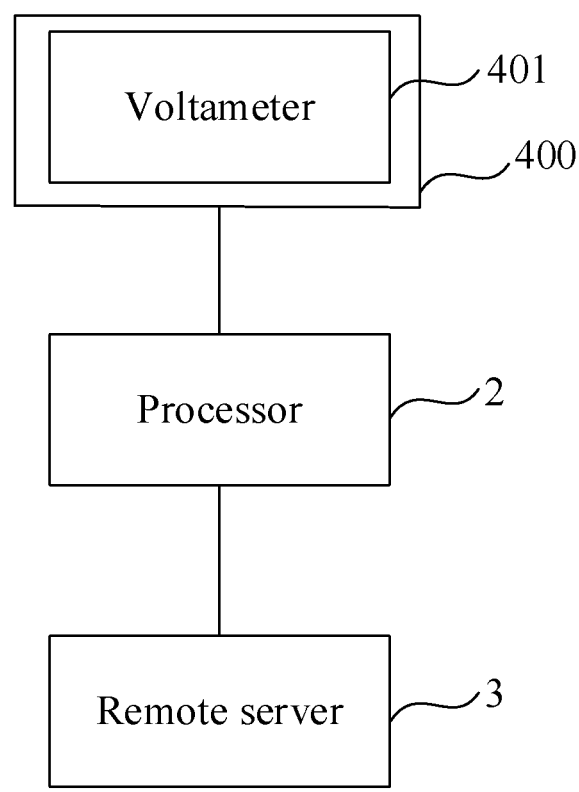
FIG. 11 is a block schematic diagram of a GNSS device according to another embodiment of the present application.

In one embodiment, as shown in FIG. 11, the lithium battery 400 includes a voltameter 401, and the voltameter 401 is configured to monitor data of the lithium battery 400 and data of the solar panel 500, and transmit the data of the lithium battery to the GNSS receiver 100 through the data line, so as to achieve monitoring of state information such as the voltage of the lithium battery 400 and the voltage, the electric quantity and the remaining working time of the solar panel 500, and further to know the operating state of the lithium battery in time, so that in a case where the operating state data of the lithium battery is abnormal, the technician can replace the lithium battery in time.

It is to be noted that the power supply of the GNSS device 200 adopts an intelligent lithium battery, and the lithium battery integrates functions of solar charging, electric quantity calculation and temperature sensor acquisition, which can achieve the state monitoring of a power supply system of the GNSS device. In one embodiment, the voltameter 401 may monitor state information such as the voltage of the solar panel 500, and the voltage, the charging current, the battery temperature, the remaining power of the battery, the estimated usage time and the like of the lithium battery 400. In a case where the processor 2 in the GNSS receiver 100 is in the resting operating state, the voltameter 401 does not upload the above battery data information. Only in a case where the processor 2 is in the wake-up operating state, the voltameter 401 uploads the above battery data information to the GNSS receiver 100, thus being beneficial to reducing the power consumption of the entire GNSS device 200; and then, the GNSS receiver 100 transmits the above battery data information to the remote server 3 through the network module 5 for reference by the technician.

The power supply battery of the GNSS device 200 adopts the intelligent lithium battery, and the battery volume is reduced. The intelligent lithium battery is hung under the GNSS receiver 100 in a hanging manner and installed in the securing column 300, which reduces the construction complexity and can be quickly deployed. When the lithium battery is hung, a cross bar perpendicular to an axis of the securing column 300 may be provided inside the securing column 300, the cross bar is welded inside the securing column 300, and a hook is provided at an upper part of the lithium battery 400 to hang the lithium battery 400 onto the cross bar. Alternatively, other manner in which the lithium battery 400 can be hung inside the securing column 300, well known to those skilled in the art, may also be used, and which is not limited herein.

The global navigation satellite module 6, the network module 5, the processor 2, the state monitoring sensor 1 and the timer 4 are integrated on the main circuit board 7, so that the integration level of the main circuit board 7 is higher. The 4G full-Netcom network antenna and the antenna of the global navigation satellite module are integrated, and the antenna 10 and the main circuit board 7 are integrated, so that the GNSS device has high integration level and small volume. An embedded system is adopted so that the processor 2 switches between the resting operating state and the wake-up operating state, the power consumption of the GNSS receiver 100 is greatly reduced, and the ratio of the capacity of the lithium battery 400 to the solar power is further reduced, thereby reducing the station construction cost, further reducing the volume of the lithium battery, reducing the weight of the lithium battery, shortening the station construction time, being suitable for rapid deployment, and being convenient for user maintenance. The GNSS device removes a base cabinet and a radome, prolongs the endurance time of the system, and is suitable for erection in complex field terrain, so that the difficulty of manual transportation is reduced, and the degree of construction responsibility is reduced. Therefore, a simple GNSS device with all-ground type, all-weather, low cost, high precision and high integration level can be achieved.

In conclusion, according to the GNSS device provided in embodiments of the present application, the demand for electric energy in the GNSS receiver is reduced through the setting of the low power consumption operating state of the processor in the GNSS receiver, and further, the power supply demand of the GNSS receiver can be satisfied only through the cooperating setting of the solar panel and the lithium battery. The lithium battery is hung inside the securing column, so that the construction is convenient, the GNSS device has a simple structure, and the construction period is shortened.

What is claimed is:

1. A GNSS device, comprising: a GNSS receiver, wherein the GNSS receiver comprises: a state monitoring sensor and a processor; wherein the state monitoring sensor is configured to monitor a state of the GNSS receiver and generate a first triggering signal according to the state of the GNSS receiver; and
wherein the processor is configured to switch from a resting operating state to a wake-up operating state according to the first triggering signal and transmit position information about the GNSS receiver to a remote server at a first preset rate; and
the GNSS device further comprising: a securing column, a lithium battery and a solar panel;
wherein the solar panel is located on a side face of the securing column, the lithium battery is hung inside the securing column, and the GNSS receiver is fixed on a top of the securing column; and the solar panel is configured to charge the lithium battery, the lithium battery is
connected to the GNSS receiver through a data line and configured to supply power to the GNSS receiver and transmit data of the lithium battery to the GNSS receiver, and the GNSS receiver is configured to transmit the data of the lithium battery to the remote server at a second preset rate.

2. The GNSS device of claim 1, wherein the lithium battery comprises a voltameter, wherein the voltameter is configured to monitor the data of the lithium battery, and transmit the data of the lithium battery to the GNSS receiver through the data line.

3. The GNSS device of claim 1, wherein the state monitoring sensor is an acceleration sensor, wherein the acceleration sensor is configured to monitor an acceleration of the GNSS receiver, and generate, in a case where the acceleration of the GNSS receiver is greater than a first preset value, the first triggering signal.

4. The GNSS device of claim 1, wherein the processor is further configured to switch from the wake-up operating state to the resting operating state in response to transmitting the position information about the GNSS receiver continuously N times to the remote server, wherein N is a positive integer.

5. The GNSS device of claim 1, further comprising:
a timer, wherein the timer is configured to start timing in response to determining that the processor switches from the wake-up operating state to the resting operating state, and generate a second triggering signal in a case where a duration recorded by the timer is greater than a second preset value; and wherein the processor is configured to switch from the resting operating state to the wake-up operating state according to the second triggering signal or the first triggering signal.

6. The GNSS device of claim 5, further comprising: a network device, wherein the network device is configured to, in a case where the processor is in the wake-up operating state, establish communication between the processor and the remote server, and wherein the network device comprises a WIFI network device or a 4G/5G full-Netcom network device.

7. The GNSS device of claim 6, further comprising a global navigation satellite device, wherein the global navigation satellite device comprises a high-precision positioning device under SOC technology, and wherein the global navigation satellite device is configured to, in a case where the processor is in the wake-up operating state, acquire the position information about the GNSS receiver at the first preset rate, and transmit the position information about the GNSS receiver to the processor.

8. The GNSS device of claim 7, wherein the high-precision positioning device, the WIFI network device or the 4G/5G full-Netcom network device, the timer, the state monitoring sensor and the processor are integrated on a main circuit board.

9. The GNSS device of claim 8, further comprising a housing, a shielding box and an antenna, wherein the shielding box is located inside the housing, the main circuit board is located inside the shielding box, and the antenna is located outside the shielding box; and the main circuit board is provided with a first radio frequency interface, the antenna is provided with a second radio frequency interface, the shielding box is provided with a through hole, and the first radio frequency interface and the second radio frequency interface are connected in a plug-in manner through the through hole.

10. The GNSS device of claim 9, wherein an antenna of the high-precision positioning device and a network antenna of the WIFI network device or the 4G/5G full-Netcom network device are integrated into the antenna of the GNSS device.

11. The GNSS device of claim 9, wherein the housing further comprises a first shell, a second shell and a gasket, wherein an end face of the first shell, the gasket and an end face of the second shell are fixedly connected by a bolt, and the gasket is in interference fit between the end face of the first shell and the end face of the second shell.

12. The GNSS device of claim 11, wherein the first shell further comprises a circular table side face and a curved surface-shaped cover formed by extending outwards from the circular table side face.

13. The GNSS device of claim 12, wherein the circular table side face is a lateral surface of a cone, and the range of the included angle between a generatrix of the lateral surface of the cone and a radius direction of a base of the cone is ranged from 85° to 89°.

14. The GNSS device of claim 11, wherein the end face of the second shell is provided with a first step comprising a first portion and a second portion, and the first portion of the first step and the second portion of the first step are arranged in a first direction pointing from an outside of the second shell to an inside of the second shell, and the first portion of the first step is farther away to the first shell than the second portion of the first step in a second direction perpendicular to the first direction.

15. The GNSS device of claim 14, wherein the end face of the first shell is provided with a second step comprising a third portion and a fourth portion, and the third portion of the second step and the fourth portion of the second step are arranged in the first direction, and the third portion of the second step is closer to the second shell than the fourth portion of the second step in the second direction.

16. The GNSS device of claim 14, wherein the first step is vertically pointed to a direction of the first shell along the second shell, and has a height in a range of 0.5 mm to 2 mm.

* * * * *